United States Patent
Ito

(10) Patent No.: US 9,330,351 B2
(45) Date of Patent: May 3, 2016

(54) IMAGE FORMING APPARATUS WITH RECURSIVE MEMORY CONFIGURED FOR SELECTIVELY STORING PRINT ERROR LOGS

(71) Applicant: CANON KABUSHIKI KAISHA, Tokyo (JP)

(72) Inventor: Chie Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/285,445

(22) Filed: May 22, 2014

(65) Prior Publication Data

US 2014/0355032 A1 Dec. 4, 2014

(30) Foreign Application Priority Data

May 28, 2013 (JP) ................................. 2013-111732

(51) Int. Cl.
*G06K 15/00* (2006.01)
*H04N 1/00* (2006.01)
*G06F 3/12* (2006.01)

(52) U.S. Cl.
CPC .................................... *G06K 15/408* (2013.01)

(58) Field of Classification Search
CPC . G06F 11/00; G06F 11/0766; G06F 11/0778; G06F 11/0787; G06F 3/1234; G06F 3/1273; H04N 1/0009; G06K 15/408
USPC ...................................... 358/1.14, 1.15, 1.16
See application file for complete search history.

(56) References Cited

U.S. PATENT DOCUMENTS

| | | | | |
|---|---|---|---|---|
| 7,293,203 | B1 * | 11/2007 | Coatney et al. | ................... 714/42 |
| 7,937,499 | B1 * | 5/2011 | Tripathi | ................... G06F 13/24 |
| | | | | 709/232 |
| 2011/0078515 | A1 * | 3/2011 | Yasukawa | ........... G06F 11/0775 |
| | | | | 714/48 |
| 2013/0114100 | A1 * | 5/2013 | Torii et al. | ..................... 358/1.14 |

FOREIGN PATENT DOCUMENTS

JP 2012-54803 A 3/2012

* cited by examiner

*Primary Examiner* — Eric A Rust
(74) *Attorney, Agent, or Firm* — Canon USA, Inc. IP Division

(57) ABSTRACT

An image-forming apparatus to process a job includes volatile memory, non-volatile memory, a judging unit, a calculating unit, a defining unit, and a controller. The volatile memory stores a generated error log using a memory area. The non-volatile memory stores information for identifying an overwrite restricted error. The judging unit judges whether a generated error is a particular error. The calculating unit calculates remaining memory which is changed by a subsequent error log being written secured, with a position where a particular error log is written in the volatile memory as a reference, where the error is the particular error. The defining unit defines an acquisition level of an error log in a stepwise manner based on the calculated remaining memory. The controller outputs an error log to an apparatus according to the defined acquisition level being a particular level at which an error log has to be output.

19 Claims, 10 Drawing Sheets

FIG. 3

| ERROR CODE | ERROR | OVERWRITE SUPPRESSION MODE |
|---|---|---|
| 001 | OUT OF PAPER | OFF |
| 002 | JAM | OFF |
| ... | ... | ... |
| ... | ... | ... |
| 100 | MEMORY FULL | ON |
| ... | ... | ... |
| 201 | ABNORMALITY IN FIRMWARE | ON |
| ... | ... | ... |
| 301 | SERVICE ERROR 1 | ON |
| 302 | SERVICE ERROR 2 | ON |

```
. . .
LOG(NORMAL,_T("A Method start"));
. . .
LOG(NORMAL,_T("B Method enter"));

LOG(NORMAL,_T("UserId: %d"), userid);

LOG(WARN,_T("WarningCode: %s"), warning);
. . .
LOG(ERROR,_T("PrinterStatus: &d"), status);
. . .
LOG(ERROR,_T("Param a=%d, b=%s"), a,b);

LOG(CRITICAL,_T("ErrorCode: %d"), error);
LOG(CRITICAL,_T("Param c=%d, d=%d"), c, d);
. . .
. . .
LOG(NORMAL,_T("A Method end"));
         (
         501
```

FIG. 5

| REMAINING CAPACITY | | LOG ACQUISITION LEVEL |
|---|---|---|
| N | 40% OR MORE | Normal |
| LOW1 | 40 TO 30% | Warning |
| LOW2 | 30 TO 20% | Error |
| LOW3 | 20 TO 5% | Critical |

FIG. 6

```
. . .
2012/MM/DD HH:MM:SS : A Method start
2012/MM/DD HH:MM:SS : B Method enter
2012/MM/DD HH:MM:SS : UserId: 100
2012/MM/DD HH:MM:SS : WarningCode 0
2012/MM/DD HH:MM:SS : PrinterStatus 100
2012/MM/DD HH:MM:SS : Param a=100 b=0
2012/MM/DD HH:MM:SS : ErrorCode: 0
2012/MM/DD HH:MM:SS : Param c=200 d=50
2012/MM/DD HH:MM:SS : A Method end
. . .
```

IMAGE FORMING APPARATUS WITH RECURSIVE MEMORY CONFIGURED FOR SELECTIVELY STORING PRINT ERROR LOGS

BACKGROUND OF THE INVENTION

1. Field of the Invention

The present invention relates an image-forming apparatus, an image-forming apparatus control method, and a program.

2. Description of the Related Art

Heretofore, it has been common for an image-forming apparatus to store and hold logs within the apparatus so that, in a case where an abnormality has occurred in the apparatus, the cause can be investigated and measures taken quickly. Inexpensive image-forming apparatuses frequently have only small memory as a log storage unit to suppress costs.

There has been a method to effectively use such small memory, in which secure memory of a certain area is secured, both ends of a linear buffer are logically connected, and management and control are performed in a circular shape (hereinafter, referred to as ring buffer).

Though small memory can effectively be used when employing the ring buffer, there has an issue in which, when reaching the end of the buffer, logs are overwritten. Technology to deal with logs being overwritten has been known, such as disclosed in Japanese Patent Laid-Open No. 2012-54803.

SUMMARY OF THE INVENTION

An external storage apparatus such as a hard disk has to be used to solve the above issue in Japanese Patent Laid-Open No. 2012-54803, it is difficult from the perspective of cost and space to apply to such an image-forming apparatus having only small memory and no external storage apparatus.

It has been found to be desirable to provide a mechanism capable of outputting a particular error log generated at job processing to an information processing apparatus before the particular error log is overwritten, even when employing volatile memory in which a memory area is employed in a recursive manner.

Aspects of the present invention include an image-forming apparatus configured to process a job, the image-forming apparatus includes volatile memory configured to store an error log generated at processing of the job recursively using a memory area having predetermined capacity, non-volatile memory configured to store information for identifying an error of which overwrite is restricted, a judging unit configured to judge whether a generated error is a particular error included in information to be identified, a calculating unit configured to calculate remaining memory which is changed by a subsequent error log being written in the memory area secured, with a position where a particular error log is written in the volatile memory as a reference, in a case that the error is the particular error, a defining unit configured to define an acquisition level of an error log stored in the volatile memory in a stepwise manner based on the calculated remaining memory, and a controller configured to output an error log written in the volatile memory to an information processing apparatus according to the defined acquisition level being a particular level at which an error log has to be output.

Further features of the present invention will become apparent from the following description of exemplary embodiments with reference to the attached drawings.

BRIEF DESCRIPTION OF THE DRAWINGS

FIG. 3 is a diagram illustrating an example of an overwrite suppression target definition file.

FIG. 4 is a diagram illustrating an example of a program list stored in flash ROM.

FIG. 5 is a diagram for describing a change state of an acquisition level of a log managed in RAM.

FIG. 6 is a diagram illustrating a log acquired in the case that a program including source codes has been executed.

DESCRIPTION OF THE EMBODIMENTS

Figure 1:
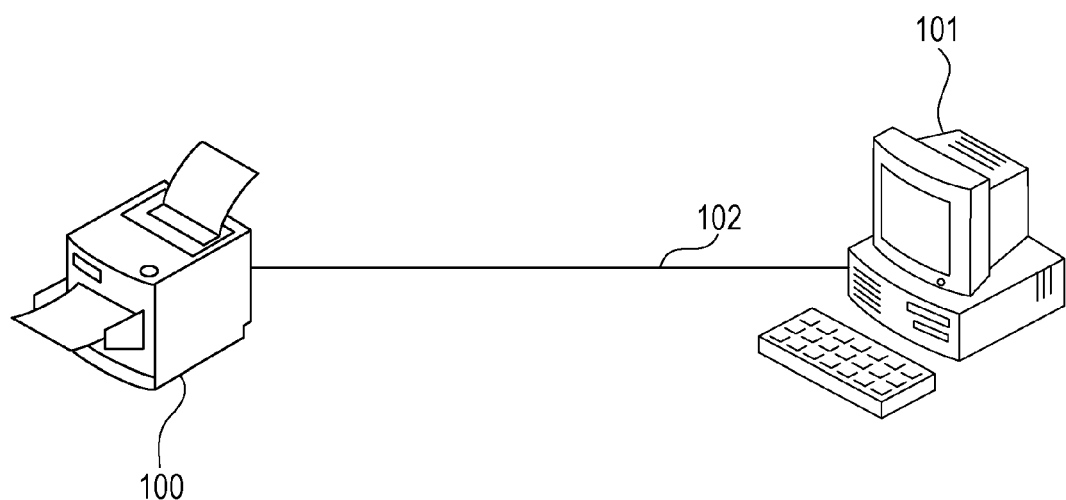
FIG. 1 is a diagram illustrating a system example including an image-forming apparatus.

Next, optimal embodiments for implementing the present invention will be described with reference to the drawings.
Description of System Configuration
First Embodiment FIG. 1 is a diagram illustrating an example of an image-forming apparatus indicating the present embodiment. This example illustrates a system example in which an information processing apparatus and the image-forming apparatus are communicable using a bidirectional interface. The present embodiment will describe an example in which the image-forming apparatus configured to process a predetermined job, for example, a job received from the information processing apparatus, includes RAM as volatile memory in which an error log generated at processing of the job can be overwritten, and further includes flash read only memory (ROM) as non-volatile memory configured to store information for identifying an error of which the overwrite is restricted.

In FIG. 1, reference numeral 100 denotes the image-forming apparatus, which forms an image on a sheet. Reference numeral 102 denotes a bidirectional interface, which connects a host machine (information processing apparatus) 101 and multiple host machines which are not illustrated, accepts a job transmitted from the host machines, and performs print processing. The host machines may read out a log held in the image-forming apparatus 100 at optional timing, and store this in the own hard disk or the like which is not illustrated.

Figure 2:
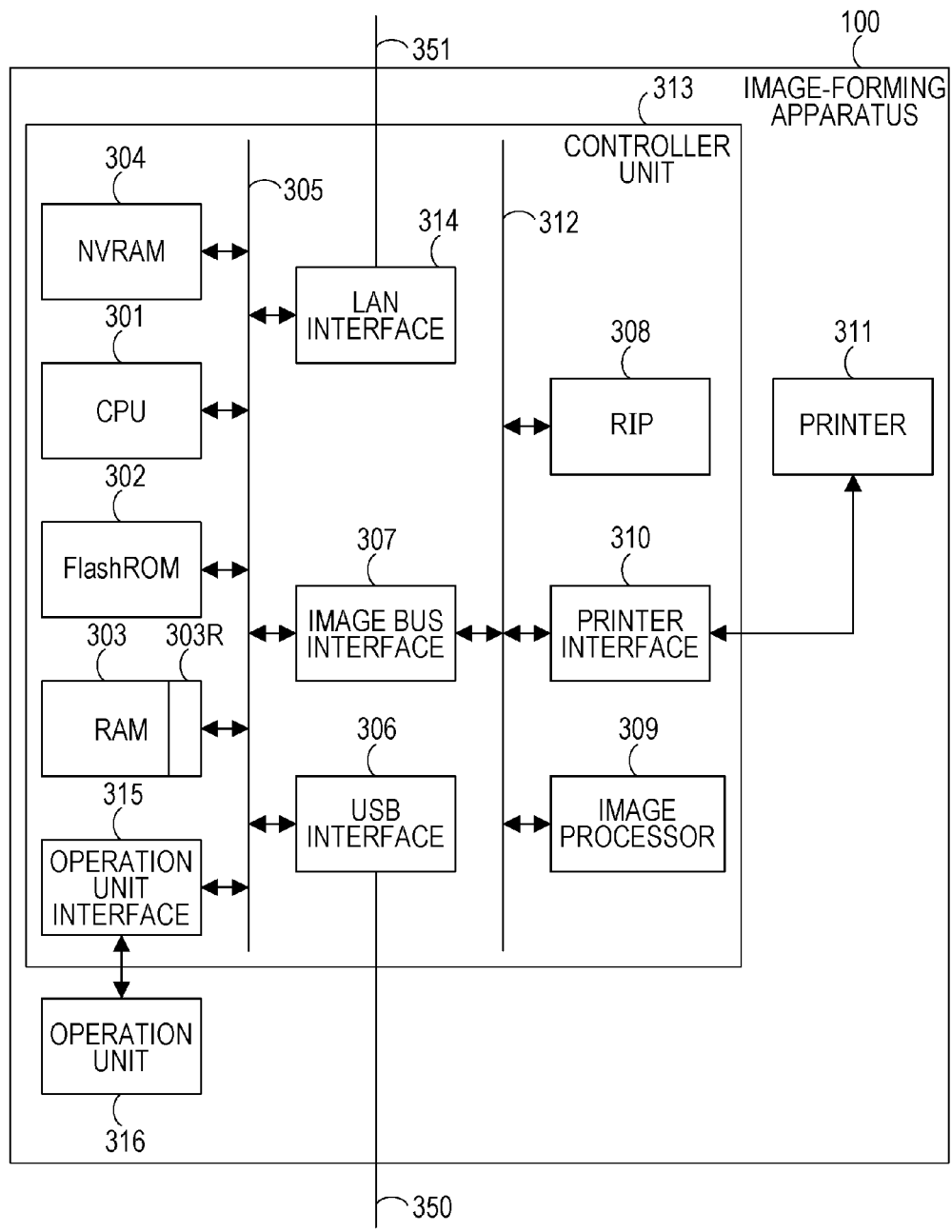
FIG. 2 is a block diagram illustrating a hardware configuration of the image-forming apparatus.

FIG. 2 is a block diagram illustrating a hardware configuration of a controller unit 313 of the image-forming apparatus 100 illustrated in FIG. 1.

In FIG. 2, the controller unit 313 connects to a printer 311 which serves as an image output device, thereby performing input and output of image data and device information. A central processing unit (CPU) 301 is a processor configured to control the overall system. Random access memory (RAM) 303 serves as system work memory for the CPU 301 operating, and also serves as program memory for recording a program, or image memory for temporarily recording image data. Reference numeral 351 denotes a network, which is used for communicating with the host machine 101 illustrated in FIG. 1. Reference numeral 350 denotes a Universal Serial Bus (USB) cable, which is used for communicating with an information processing apparatus including a USB interface.

Non-volatile RAM (NVRAM) 304 is configured including non-volatile memory, which stores definition information defined as to the image-forming apparatus 100, and so forth. An operation unit 316 holds a light-emitting diode (LED) indicating the states of keys for operating a device, and the state of the device. An operation unit interface 315 is an interface unit as to the operation unit 316, which transmits control information of the LED held at the operation unit 316.

Also, the operation unit interface 315 serves as a role configured to inform information input by a user from the operation unit 316 to the CPU 301. Flash read only memory (ROM) 302 is writable non-volatile memory in which various control programs for controlling the system are recorded. A USB interface 306 enables USB connection with an external device.

A local area network (LAN) interface 314 enables LAN connection as to an external device. The above-described devices are disposed on a system bus 305. An image bus 307 is a bus bridge which connects the system bus 305 and an image bus 312 configured to transfer image data at high speed, and converts a data structure. The image bus 312 is configured including a peripheral component interconnect (PCI) bus or IEEE1394. The following devices are disposed on the image bus 312.

A raster image processor raster image processor (RIP) 308 rasterizes vector data such as page description language (PDL) code to a bitmap image.

A printer interface 310 connects the printer 311 and controller unit 313, and performs synchronous/asynchronous conversion of image data, transmission/reception of control commands, and power supply. An image processor 309 performs correction, processing, or editing on input image data, or performs correction of the printer, and resolution conversion on image data to be output for printing. Also, in addition to this, the image processor 309 performs rotation of image data, and performs compression/decompression processing such as Joint Photographic Experts Group (JPEG) on multi-value image data, such as Joint Bi-level Experts Group JBIG, Modified Modified READ (MMR), modified Huffman (MH), or the like on binary image data. The printer 311 is equivalent to a portion configured to convert raster image data into an image on paper. Examples of a method thereof include an electrophotographic method using a photosensitive drum or photosensitive belt, and an inkjet method for ejecting ink from a minute nozzle array to directly print an image on paper, but any method may be employed. Activation of print operation is started by instructions from the CPU 301.

Part of the volatile RAM 303 is used as an area for log storage in the present embodiment. The present embodiment controls this area as a ring buffer 303R, and stores logs therein. The ring buffer 303R secures memory of a certain area, uses a linear buffer as circular memory by logically connecting both ends of this buffer, and performs management and control of the above logs. The ring buffer memory per se is memory recursively using a memory area having predetermined capacity.

FIG. 3 is a diagram illustrating an example of an overwrite suppression target definition file as to the RAM 303 illustrated in FIG. 2. This file is an example of a definition file configured to define an error, to be subjected to ring buffer overwrite suppression. This example illustrates memory error, abnormality in firmware, and service error, as errors regarding which overwrite is restricted, and illustrates an out-of-paper error, and a jam error as an error regarding which the overwrite is not restricted.

In FIG. 3, the user specifies "ON (F=1)" or "OFF (F=0)" at a flag 401 regarding an error of which suppressing overwrite is desired. At the time of occurrence of the specified error, the system operates under a mode for suppressing overwrite as much as possible (hereinafter, overwrite suppression mode). Note that the contents defined in This definition file are saved in the NVRAM 304. The contents saved in the NVRAM 304 are configured so as to be read out at the time of setting of the information processing apparatus and operation unit, to confirm the contents of the flag 401, or to modify or correct the flag contents. Note that, in FIG. 3, error code "100" and thereafter are error codes corresponding to significant errors, and are error codes of which the overwrite has to be suppressed. Accordingly, after an error code corresponding to this significant error is written in the ring buffer 303R, this has to be informed to the host side before an error generated thereafter is overwritten on this written area. Also, an example will be described in the present embodiment in which the RAM 303 used as volatile memory is used as the ring buffer 303R on which the log of an error generated at processing of a job can be overwritten while circling address space.

FIG. 4 is a diagram illustrating an example of a program list to be stored in the flash ROM 302 illustrated in FIG. 2. This example is an example of source code to output logs managed in the ring buffer 303R in the RAM 303.

In FIG. 4, reference numeral 501 denotes log levels. A level of NORMAL, WARNING, ERROR, or CRITICAL is set to all logs. "LOG" illustrated in FIG. 4 is a macro for writing a log in the buffer.

FIG. 5 is a diagram for describing the change state of the acquisition level of a log managed in the RAM 303 illustrated in FIG. 1. This example is a correspondence table between remaining capacity and an acquisition level, which indicates the change of the acquisition level of the log in accordance with the remaining capacity of the log buffer memory since an error defined in the definition file illustrated in FIG. 3 was generated until the generated log is overwritten.

In FIG. 5, a threshold value of 40% is represented by N, and in the case that the remaining capacity is equal to or greater than N, that is, in the case that the remaining capacity is equal to or greater than 40%, the log acquisition level is Normal. When the log acquisition level is Normal, as illustrated in FIG. 4, all of the logs having a log level of NORMAL, WARNING, ERROR, or CRITICAL defined in stepwise manner are acquired. Note that error codes generated while the image-forming apparatus processes a job are sequentially written in the ring buffer 303R. Since the ring buffer 303R has a ring buffer structure, an error code stored in the same storage area is also overwritten by an error code generated thereafter. Therefore, the present embodiment writes the positions (addresses) in the ring buffer 303R where a significant error has occurred and error code has been written, in another area in the RAM 303 for management. When writing an error code generated at the subsequent job processing, the host machine 101 calculates remaining capacity up to a position where this significant error was written, and changes the log acquisition level to be recognized. Specifically, the CPU 301 performs control to change the log acquisition level in the order of Normal, Warning, Error, and Critical. Here, the CPU 301 performs control by correlating the log acquisition levels corresponding to WARNING, ERROR, and CRITICAL with particular levels respectively so as to change later-described log acquisition processing.

Thus, even when a particular error is generated by a job that the image-forming apparatus executes thereafter, the CPU 301 performs control to reference the current log acquisition level at the time of occurrence of the error. Next, the CPU 301 may inform the host machine 101 of error codes including a significant error code stored in the ring buffer 303R, before the significant error code, that the image-forming apparatus stored in the particular position in the ring buffer 303R is overwritten. After the error codes are informed to the host machine 101, the CPU 301 changes the log acquisition level in the ring buffer 303R to Normal, and cyclically executes error code writing processing.

In the case that a threshold value of 30% is represented by LOW1, and the remaining capacity is less than N and also equal to or greater than LOW1, that is, in the case that the remaining capacity is less than 40% and also equal to or greater than 30%, the CPU 301 changes the log acquisition level to Warning. When the log acquisition level is Warning, the CPU 301 acquires the logs of WARNING, ERROR, and CRITICAL defined in FIG. 4.

In the case that a threshold value of 20% is represented by LOW2, and the remaining capacity is less than LOW1 and also equal to or greater than LOW2, that is, in the case that the remaining capacity is less than 30% and also equal to or greater than 20%, the CPU 301 changes the log acquisition level to Error. When the log acquisition level is Error, the CPU 301 acquires the logs of ERROR and CRITICAL defined in FIG. 4.

In the case that a threshold value of 5% is represented by LOW3, and the remaining capacity is less than LOW2 and also equal to or greater than LOW3, that is, in the case that the remaining capacity is less than 20% and also equal to or greater than 5%, the CPU 301 changes the log acquisition level to Critical. When the log acquisition level is Critical, the CPU 301 acquires the logs of CRITICAL alone defined in FIG. 4.

Note that the threshold values N, LOW1, LOW2, and LOW3 may be set optionally, and are not restricted to the numeric values described in the present embodiment.

FIG. 6 is a diagram illustrating logs acquired at the time of a program including the source codes defined in FIG. 4 being executed.

FIG. 6 illustrates logs when the log acquisition level is Normal. At the time of Normal, the CPU 301 acquires all of the logs of NORMAL, WARNING, ERROR, and CRITICAL defined in FIG. 4. When the log acquisition level is Warning, the CPU 301 does not acquire logs defined by NORMAL, and acquires the logs of WARNING, ERROR, and CRITICAL.

When the log acquisition level is Error, the CPU 301 does not acquire the logs specified by NORMAL and WARNING, and acquires the logs of ERROR and CRITICAL. When the log acquisition level is Critical, the CPU 301 does not acquire the logs specified by NORMAL WARNING, and ERROR, and acquires the logs of CRITICAL alone.

Figure 7:
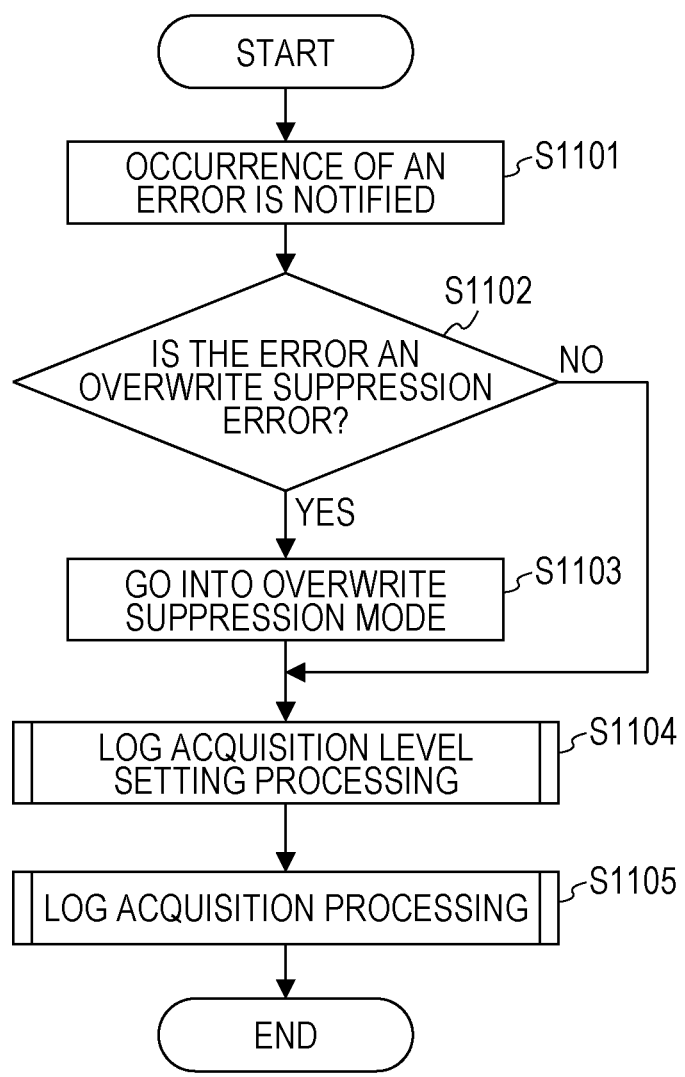
FIG. 7 is a flowchart for describing a control method for the image-forming apparatus.

FIG. 7 is a flowchart for describing a control method of the image-forming apparatus illustrated in the present embodiment. This example is a log processing example of the image-forming apparatus 100 in the case that an error defined in FIG. 3 has occurred. Note that the steps are realized by the CPU 301 executing a control program stored in the flash ROM 302.

Upon occurrence of an error being informed to the controller (S1101), the CPU 301 determines whether or not the error that has occurred is an error specified in FIG. 3 (S1102). Here, in the case of the CPU 301 determining that the error is a specified error (Yes in S1102), the CPU 301 changes the mode as to the ring buffer secured on the RAM 303 to the overwrite suppression mode (S1103).

Next, the CPU 301 performs setting of the log acquisition level (S1104), acquires the logs from the NVRAM 304 with reference to the specified log level (S1105), and ends this processing.

On the other hand, in the case of the CPU 301 determining that the error that has occurred is not an error specified in FIG. 3 in S1102 (No in S1102), the CPU 301 proceeds to S1104 without changing the log level from the initial setting.

Figure 8:
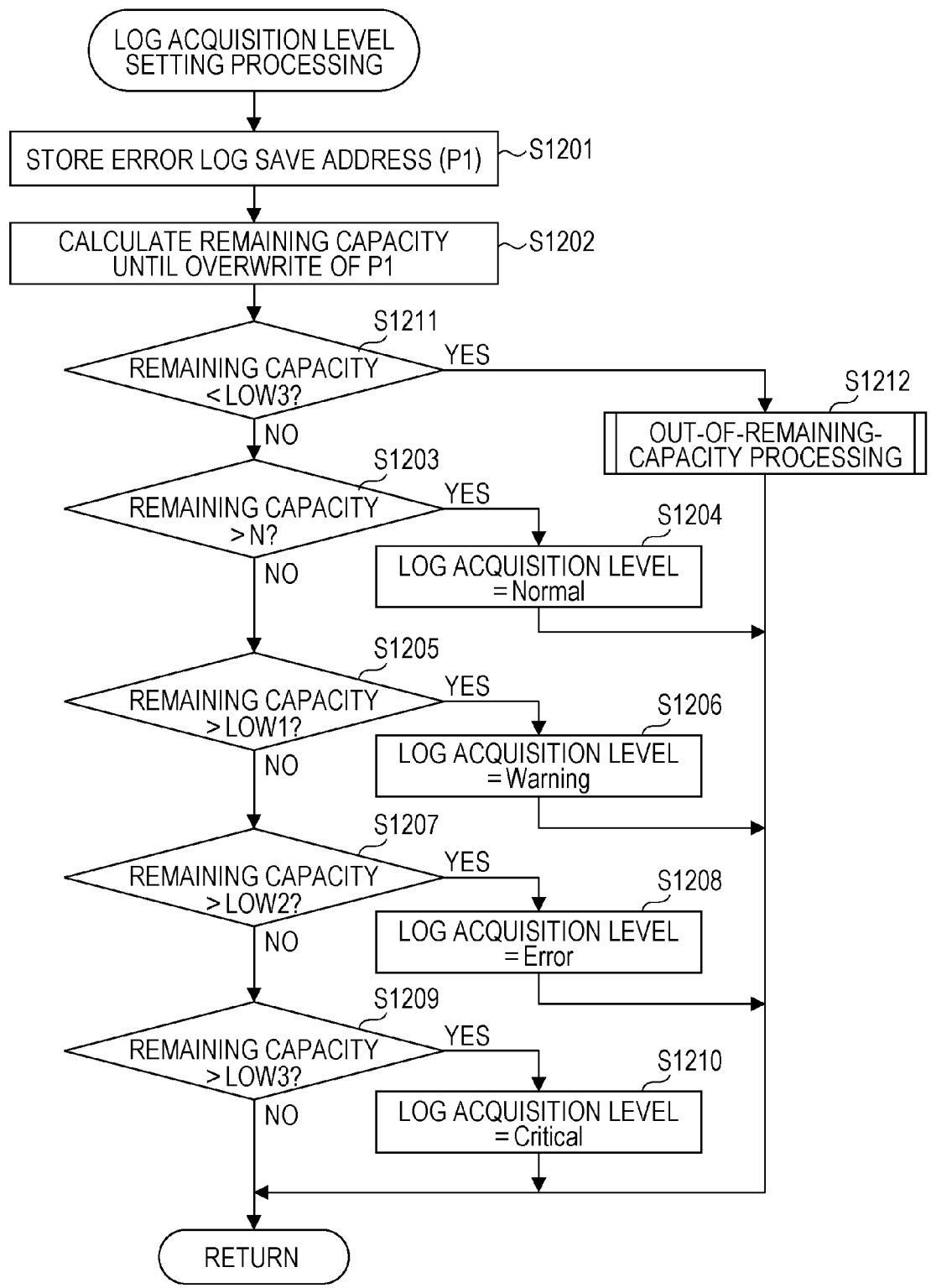
FIG. 8 is a flowchart for describing the control method for the image-forming apparatus.

FIG. 8 is a flowchart for describing a control method of the image-forming apparatus illustrated in the present embodiment. This example is a setting processing example at the time of the log acquisition level being changed to the overwrite suppression mode illustrated in S1104 illustrated in FIG. 7. Note that the steps are realized by the CPU 301 executing the control program stored in the flash ROM 302.

First, the CPU 301 stores the address on the buffer (generation point P1) where an error set in FIG. 3 has occurred, in another area in the RAM 303 (S1201). Next, the CPU 301 calculates the remaining capacity of the ring buffer up to the occurrence point (S1202). The CPU 301 calculates remaining memory in which the CPU 301 may seize an error that subsequently occurs with a position where the particular log error was written as a reference, and write a new error log in the ring buffer 303R.

Next, the CPU 301 determines whether or not the calculated remaining capacity is smaller than LOW3 serving as the lower limit. Here, in the case of determining that the calculated remaining capacity is lower than LOW3 serving as the lower limit (S1211), the CPU 301 performs out-of-remaining-capacity processing (S1212), and returns from the processing.

On the other hand, in the case of determining that the calculated remaining capacity is greater than LOW3 serving as the lower limit in S1211, the CPU 301 determines whether or not the calculated remaining capacity is greater than the threshold value N illustrated in FIG. 5 (S1203). Here, in the case of determining that the calculated remaining capacity is greater than the threshold value N illustrated in FIG. 5, the CPU 301 sets the log acquisition level to Normal (S1204), and this processing returns.

On the other hand, in the case of determining that the calculated remaining capacity is lower than the threshold value N illustrated in FIG. 5 in S1203, the CPU 301 determines whether or not the remaining capacity is greater than LOW1 (S1205). Here, in the case of determining that the calculated remaining capacity is greater than LOW1, the CPU 301 sets the log acquisition level to Warning (S1206), and this processing returns.

On the other hand, in the case of determining that the remaining capacity is lower than LOW1 in S1205, the CPU 301 determines whether or not the remaining capacity is greater than LOW2 (S1207). Here, in the case of determining that the remaining capacity is greater than LOW2, the CPU 301 sets the log acquisition level to Error (S1208), and this processing returns.

On the other hand, in the case of determining that the remaining capacity is lower than LOW2 in S1207, the CPU 301 determines whether or not the remaining capacity is greater than LOW3 (S1209). Here, in the case of determining that the remaining capacity is greater than LOW3, the CPU 301 sets the log acquisition level to Critical (S1210), and this processing returns. Also, in the case of determining that the remaining capacity is smaller than LOW3, the CPU 301 this processing returns.

Figure 9:
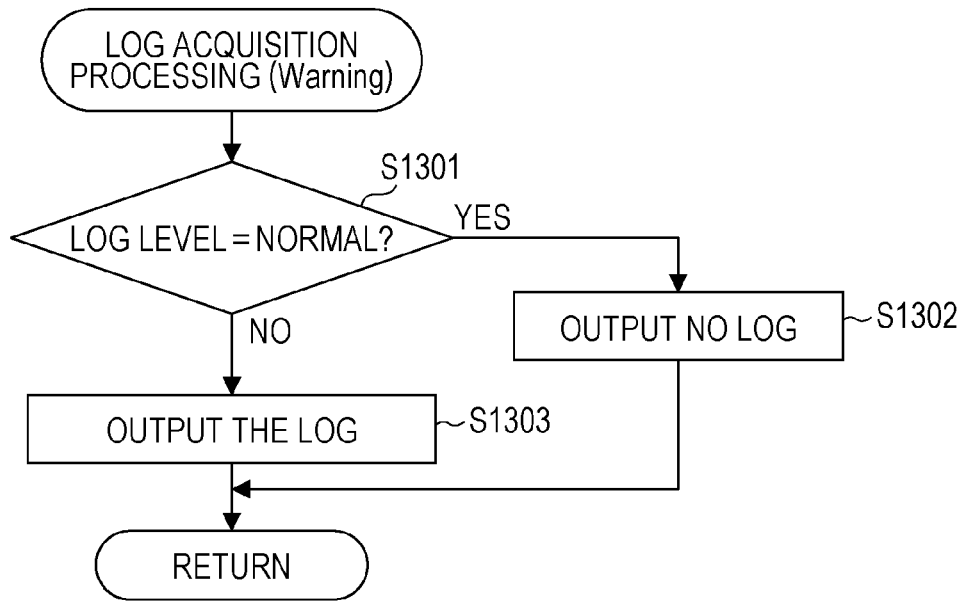
FIG. 9 is a flowchart for describing the control method for the image-forming apparatus.
Figure 10:
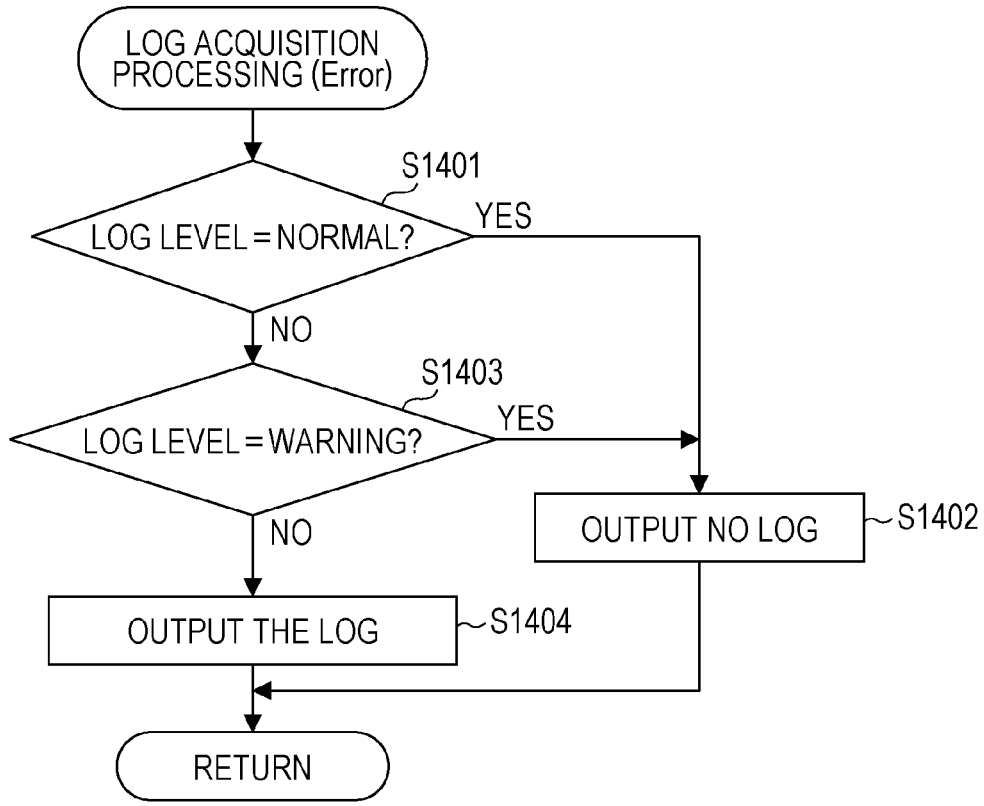
FIG. 10 is a flowchart for describing the control method for the image-forming apparatus.
Figure 11:
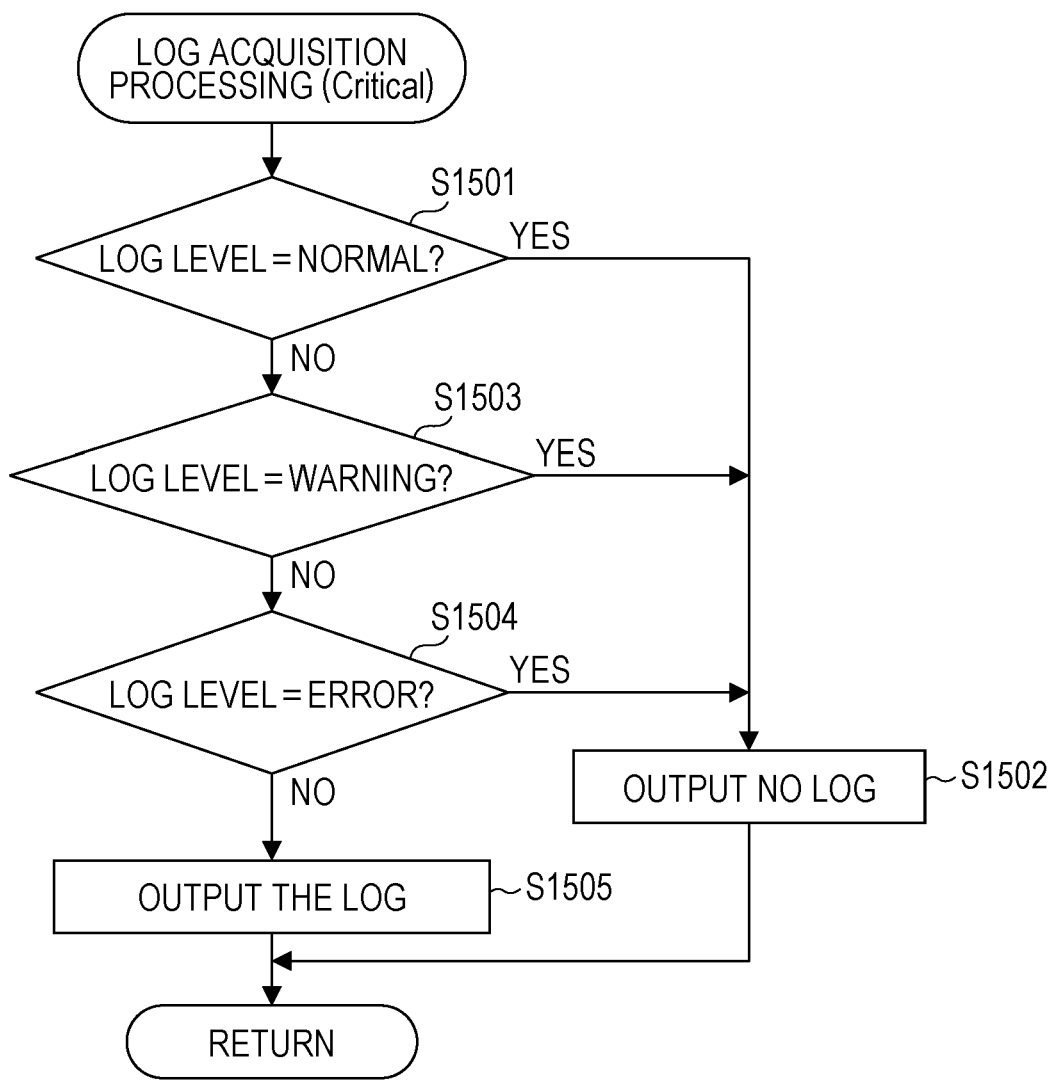
FIG. 11 is a flowchart for describing the control method for the image-forming apparatus.

Hereinafter, details of the log acquisition processing illustrated in S1105 will be described with reference to FIGS. 9, 10, and 11. FIGS. 9, 10, and 11 correspond to processing examples at the time of the source codes illustrated in FIG. 4 being executed in the case that the log acquisition level illustrated in FIG. 8 is set to other than Normal. Note that in the case that the log acquisition level is Normal, the program outputs all of the logs to the ring buffer 303R regardless of the levels of the logs.

FIG. 9 is a flowchart for describing a control method for the image-forming apparatus illustrated in the present embodiment. This example is a processing example when the log acquisition level corresponding to S1206 illustrated in FIG. 8 is Warning. Note that the steps are realized by the CPU 301 executing the control program stored in the flash ROM 302.

When executing the log output code, the CPU 301 determines whether or not the log level is NORMAL (S1301). Here, in the case of determining that the log level is NORMAL, the CPU 301 does not output the log (S1302), and this processing returns. On the other hand, in the case of determining that the log level is not NORMAL, the CPU 301 outputs the log to the ring buffer 303R (S1303), and this processing returns.

FIG. 10 is a flowchart for describing a control method for the image-forming apparatus illustrated in the present embodiment. This example is a processing example when the log acquisition level corresponding to S1208 illustrated in FIG. 8 is Error. Note that the steps are realized by the CPU 301 executing the control program stored in the flash ROM 302.

When executing the log output code, the CPU 301 determines whether or not the log level is NORMAL (S1401). Here, in the case of determining that the log level is NORMAL, the CPU 301 does not output the log (S1402), and this processing returns.

On the other hand, in the case of determining that the log level is not NORMAL in S1401, the CPU 301 determines whether or not the log level is WARNING (S1403). Here, in the case of determining that the log level is WARNING, the CPU 301 does not output the log (S1402), and this processing returns.

On the other hand, in the case of determining that the log level is not WARNING in S1401, when determining that the log level is ERROR and CRITICAL, the CPU 301 outputs the log to the ring buffer 303R (S1404), and this processing returns.

FIG. 11 is a flowchart for describing a control method for the image-forming apparatus illustrated in the present embodiment. This example is a processing example when the log acquisition level corresponding to S1210 illustrated in FIG. 8 is Critical. Note that the steps are realized by the CPU 301 executing the control program stored in the flash ROM 302.

When executing the log output code, the CPU 301 determines whether or not the log level is NORMAL (S1501). Here, in the case of determining that the log level is NORMAL, the CPU 301 does not output the log (S1502), and this processing returns.

On the other hand, in the case of determining that the log level is not NORMAL in S1501, the CPU 301 determines whether or not the log level is WARNING (S1503). Here, in the case of determining that the log level is WARNING, the CPU 301 does not output the log (S1502), and this processing returns.

On the other hand, in the case of determining that the log level is not WARNING in S1503, the CPU 301 determines whether or not the log level is ERROR (S1504). Here, in the case of determining that the log level is ERROR, the CPU 301 does not output the log (S1502), and this processing returns.

On the other hand, in the case of determining that the log level is not ERROR in S1504, the CPU 301 determines that the log level is CRITICAL, and outputs the log to the ring buffer 303R (S1505), and this processing returns.

Note that, upon a log on the buffer being read out by instructions from the host machine during operation in the overwrite suppression mode in the above processing, the CPU 301 escapes from the overwrite suppression mode, and returns the log acquisition mode to Normal. Also, in the case that settings have been made that logs are invariably uploaded from the host machine, the CPU 301 does not change to the overwrite suppression mode even when a specified error occurs.

Note that, when changing to a log acquisition level other than Normal during operation in the overwrite suppression mode in the above embodiment, informing the current log acquisition level to the host machine enables the user to be prompted to read out a log. Description will be made regarding a case where an application, which is not illustrated, is running for displaying the state of the image-forming apparatus 100 on the host machine.

In the case of determining that the log acquisition level has been changed to a predetermined acquisition level by the flow illustrated in FIG. 8, the CPU 301 displays a warning message indicating the current log acquisition level on the application. This may be handled as an operator call by the user's setting, to wait for the user's operations.

Figure 12:
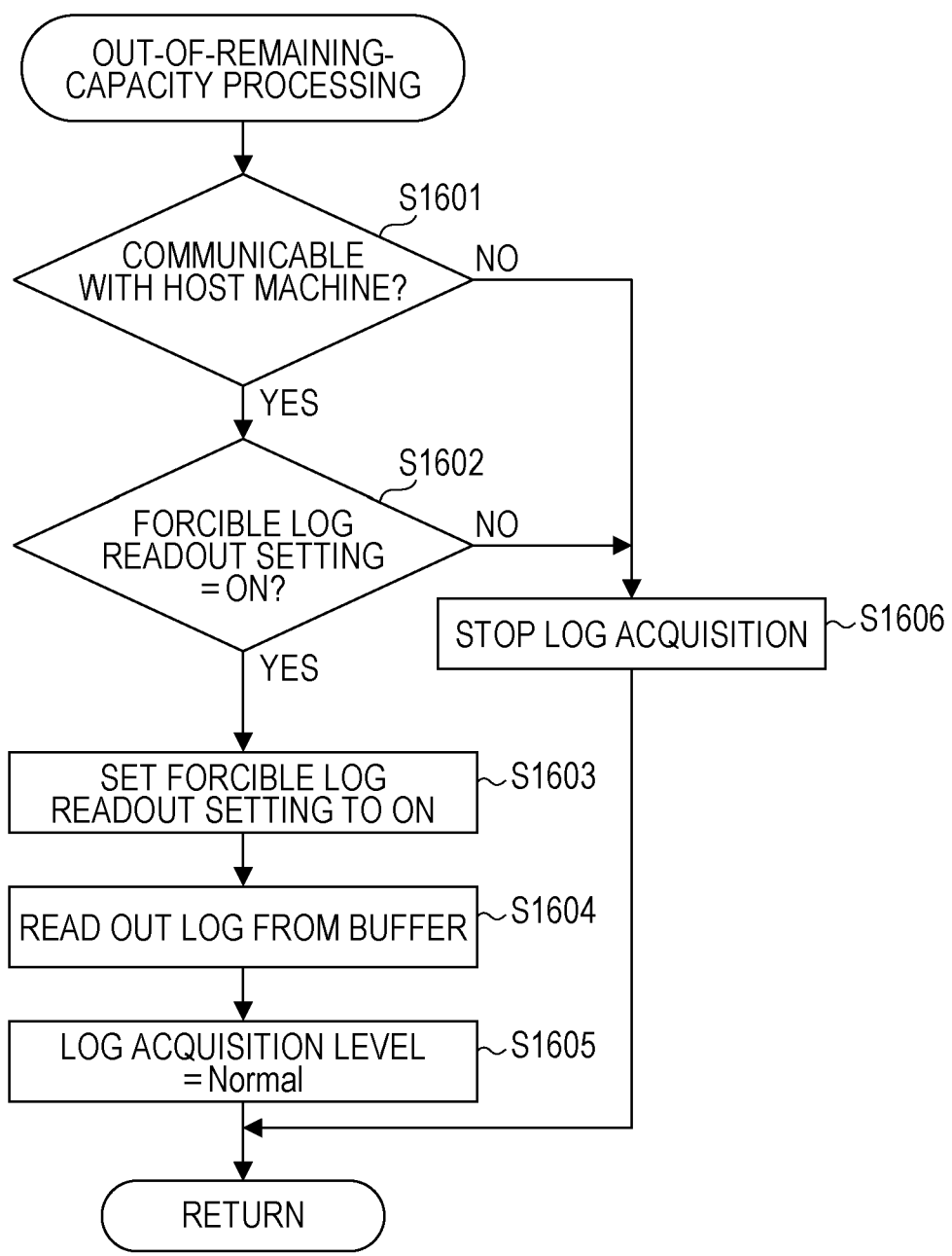
FIG. 12 is a flowchart for describing the control method for the image-forming apparatus.

FIG. 12 is a flowchart for describing a control method for the image-forming apparatus illustrated in the present embodiment. This example is a detailed processing example of the out-of-remaining-capacity processing illustrated in FIG. 8. More specifically, this example is a processing example in the case that readout is not instructed from the host machine during operation in the overwrite suppression mode, and the remaining capacity of the buffer reaches equal to or smaller than LOW3. Note that the steps are realized by the CPU 301 executing the control program stored in the flash ROM 302.

Readout of a log is executed by instructions from the host machine 101 in this processing, but this may forcibly be pushed. Forcible push may invariably be allowed, or permission/rejection for forcible push may be set by the user.

In the case of determining that the remaining capacity after overwrite is equal to or smaller than LOW3, the CPU 301 determines whether to be communicable with the host machine 101 (S1601). Here, in the case of determining that the image-forming apparatus 100 is communicable with the host machine 101, the CPU 301 determines whether or not forcible push has been allowed (S1602).

Here, the CPU 301 changes the setting for forcible log readout to "ON" state so as to cause the host machine 101 to read out a log (S1603). Next, in the same way as a case where the host machine side is instructed to perform readout by the user, the CPU 301 reads out a log (S1604). Upon the setting being changed so as to read out a log, the CPU 301 sets the log acquisition level to Normal (S1605), and this processing returns.

On the other hand, in the case of determining that the image-forming apparatus 100 is incommunicable with the host machine 101 in S1601, or, in S1602, in the case of determining that forcible push is not allowed, the CPU 301 temporarily stops acquisition of logs (S1606), and this processing returns.

Thus, it is expected that the time series of logs after occurrence of an error is maintained, which contributes to cause investigation of errors. Also, the log of a secondary error caused due to occurrence of an error is protected, which enables effective cause investigation.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-111732, filed May 28, 2013, which is hereby incorporated by reference herein in its entirety.

What is claimed is:

1. An image forming apparatus comprising:
a processor configured to generate a plurality of print logs from events of a print job processed by the image forming apparatus, wherein each print log includes a log acquisition level associated with a predetermined print job event;
a first determining unit, implemented by the processor, configured to determine, in response to a predefined error event occurring at print job processing, whether the error event is an overwrite suppression error event;
a recursive memory configured to store print logs and overwrite a first print log with a second print log, wherein, in response to determining that the occurred error event is an overwrite suppression error event, the processor changes a mode of the recursive memory from a normal transfer mode to an overwrite suppression transfer mode;
a setting unit, implemented by the processor, configured to set a log acquisition level based on a remaining memory capacity of the recursive memory, wherein, in response to a generated print log having a log acquisition level that is equal to or greater than the set log acquisition level, the processor transmits, to the recursive memory, the generated print log having the log acquisition level that is equal to or greater than the set log acquisition level; and
a notifying unit configured to notify a print log from the recursive memory to an external apparatus,
wherein, in a case where the mode of the recursive memory is the overwrite suppression transfer mode and the recursive memory stores, as an overwrite suppression print log, a print log of an error event that is an overwrite suppression error event, the recursive memory further is configured to overwrite the overwrite suppression print log only after the notifying unit notifies the overwrite suppression print log to the external apparatus.

2. The image forming apparatus according to claim 1, wherein the processor generates each print log by combining parameter values from a printer into one of a plurality of predetermined source codes.

3. The image forming apparatus according to claim 1, wherein the first determining unit determines that an error event is an overwrite suppression error event by determining whether a user designated an error type of the error event as having overwrite suppression.

4. The image forming apparatus according to claim 1, further comprising a storage configured to store print logs and store information to determine whether an error event is an overwrite suppression error event,
wherein the processor transmits each print log to the storage, and
wherein, in response to a generated print log in the storage having a log acquisition level that is equal to or greater than the set log acquisition level, the processor transmits, to the recursive memory, the generated print log in the storage having the log acquisition level that is equal to or greater than the set log acquisition level.

5. The image forming apparatus according to claim 1, wherein the recursive memory is a ring buffer that is part of a volatile read only memory, and
wherein the print job processed by the image forming apparatus is received from the external apparatus.

6. The image forming apparatus according to claim 1, wherein error events related to the processing of a print job, including out of paper and paper jam error events, are not overwrite suppression error events, and error events related to the recursive memory, including a memory full error event, are overwrite suppression error events.

7. The image forming apparatus according to claim 1, wherein error events associated with an error code equal to or greater than a predetermined number are overwrite suppression error events and error events associated with an error code less than a predetermined number are not overwrite suppression error events.

8. The image forming apparatus according to claim 1, wherein, prior to setting a log acquisition level based on a remaining memory capacity of the recursive memory, the setting unit consults a table contain a plurality of log acquisition levels, each associated with a remaining capacity range, wherein the remaining capacity range is configured to be specified by a user.

9. The image forming apparatus according to claim 8, wherein, in response setting the log acquisition level to a predetermined level, the notifying unit notifies the set log acquisition level to the external apparatus.

10. The image forming apparatus according to claim 9, wherein, in response setting the log acquisition level to a predetermined level, the processor causes a user warning message to be displayed on a display of the external apparatus.

11. The image forming apparatus according to claim 1, wherein, after the processor determines that the remaining memory capacity of the recursive memory is not within any remaining capacity range specified by a user, the processor stores, in a memory other than the recursive memory, an address of each overwrite suppression print log stored in the recursive memory.

12. The image forming apparatus according to claim 1, wherein the processor stores, in a memory other than the recursive memory, an address of each overwrite suppression print log stored in the recursive memory.

13. The image forming apparatus according to claim 1, wherein, in response to determining that the remaining memory capacity of the recursive memory is lower than a predetermined amount, the image forming apparatus forcibly causes the external apparatus to read out at least one print log from the recursive memory.

14. The image forming apparatus according to claim 1, wherein, in response to determining that the remaining memory capacity of the recursive memory is lower than a predetermined amount and that the image forming apparatus is unable to forcibly causes the external apparatus to read out at least one print log from the recursive memory.

15. The image forming apparatus according to claim 1, wherein, after determining the remaining memory capacity of the recursive memory is not lower than a first predetermined amount, the processor determines whether the remaining memory capacity of the recursive memory is greater than a second predetermined amount that is greater than the first predetermined amount.

16. The image forming apparatus according to claim 1, wherein, in response to a print log on the recursive memory being read out by instructions from the external apparatus during operation in the overwrite suppression mode, the processor changes the mode of the recursive memory from the overwrite suppression transfer mode to the normal transfer mode.

17. The image forming apparatus according to claim 1, wherein, in response to the recursive memory receiving a log from the external apparatus during operation in the overwrite suppression mode, the processor refrains from changing the mode of the recursive memory from the overwrite suppression transfer mode to the normal transfer mode.

18. A method for an image forming apparatus, wherein the image forming apparatus includes a processor configured to generate a plurality of print logs from events of a print job processed by the image forming apparatus, wherein each print log includes a log acquisition level associated with a predetermined print job event, and a recursive memory configured to store print logs and overwrite a first print log with a second print log, the method comprising:
  determining, in response to a predefined error event occurring at print job processing, whether the error event is an overwrite suppression error event,
  wherein, in response to determining that the occurred error event is an overwrite suppression error event, the processor changes a mode of the recursive memory from a normal transfer mode to an overwrite suppression transfer mode;
  setting a log acquisition level based on a remaining memory capacity of the recursive memory, wherein, in response to a generated print log having a log acquisition level that is equal to or greater than the set log acquisition level, the processor transmits, to the recursive memory, the generated print log having the log acquisition level that is equal to or greater than the set log acquisition level; and
  notifying a print log from the recursive memory to an external apparatus,
  wherein, in a case where the mode of the recursive memory is the overwrite suppression transfer mode and the recursive memory stores, as an overwrite suppression print log, a print log of an error event that is an overwrite suppression error event, the recursive memory further is configured to overwrite the overwrite suppression print log only after the overwrite suppression print log is notified to the external apparatus.

19. A non-transitory computer-readable storage medium storing a program to cause an image forming apparatus to perform a method, wherein the image forming apparatus includes a processor configured to generate a plurality of print logs from events of a print job processed by the image forming apparatus, wherein each print log includes a log acquisition level associated with a predetermined print job event, and a recursive memory configured to store print logs and overwrite a first print log with a second print log, the method comprising:
  determining, in response to a predefined error event occurring at print job processing, whether the error event is an overwrite suppression error event,
  wherein, in response to determining that the occurred error event is an overwrite suppression error event, the processor changes a mode of the recursive memory from a normal transfer mode to an overwrite suppression transfer mode;
  setting a log acquisition level based on a remaining memory capacity of the recursive memory, wherein, in response to a generated print log having a log acquisition level that is equal to or greater than the set log acquisition level, the processor transmits, to the recursive memory, the generated print log having the log acquisition level that is equal to or greater than the set log acquisition level; and
  notifying a print log from the recursive memory to an external apparatus,
  wherein, in a case where the mode of the recursive memory is the overwrite suppression transfer mode and the recursive memory stores, as an overwrite suppression print log, a print log of an error event that is an overwrite suppression error event, the recursive memory further is configured to overwrite the overwrite suppression print log only after the overwrite suppression print log is notified to the external apparatus.

* * * * *